United States Patent
Sassa

(10) Patent No.: US 6,455,604 B1
(45) Date of Patent: Sep. 24, 2002

(54) PROCESS FOR PRODUCING FOAMED RUBBER

(75) Inventor: Tatsuo Sassa, Chiba (JP)

(73) Assignee: Sumitomo Chemical Company, Limited, Oaska (JP)

( * ) Notice: Subject to any disclaimer, the term of this patent is extended or adjusted under 35 U.S.C. 154(b) by 0 days.

(21) Appl. No.: 09/940,478

(22) Filed: Aug. 29, 2001

(30) Foreign Application Priority Data

Sep. 8, 2000 (JP) ........................................ 2000-272872

(51) Int. Cl.⁷ .................................................. C08J 9/00
(52) U.S. Cl. ........................... 521/142; 521/79; 521/91; 521/92; 521/143; 521/150
(58) Field of Search ................. 521/142, 150, 521/143, 79, 91, 92

(56) References Cited

U.S. PATENT DOCUMENTS

| | | | | |
|---|---|---|---|---|
| 4,590,123 A | * | 5/1986 | Hashimoto et al. ............ | 521/91 |
| 4,710,317 A | * | 12/1987 | Tabata et al. ................ | 521/907 |
| 5,030,662 A | * | 7/1991 | Banerjie ...................... | 521/134 |
| 5,635,562 A | * | 6/1997 | Malcolm ...................... | 521/79 |
| 5,728,744 A | * | 3/1998 | Okada et al. ................ | 521/140 |
| 6,268,428 B1 | | 7/2001 | Okita et al. .................. | 524/515 |

FOREIGN PATENT DOCUMENTS

| | | |
|---|---|---|
| JP | 11-310654 | 11/1999 |
| JP | 2000-1558 | 1/2000 |
| JP | 2000-44711 | 2/2000 |
| JP | 2000-226464 | 8/2000 |

* cited by examiner

*Primary Examiner*—Morton Foelak
(74) *Attorney, Agent, or Firm*—Sughrue Mion, PLLC

(57) ABSTRACT

There is provided a process for producing a foamed rubber comprising a step of foaming a rubber composition, which composition comprises:

(A) 100 parts by weight of an ethylene-α-olefin copolymer rubber, (B) 10 to 100 parts by weight of mica, and (C) 2 to 10 parts by weight of a foaming agent.

4 Claims, No Drawings

PROCESS FOR PRODUCING FOAMED RUBBER

FIELD OF THE INVENTION

The present invention relates to a process for producing a foamed rubber having a light weight (namely, a low density), a high stress and a low compression set. The word "high stress" means that a 100% tensile stress is high for a density of the foamed rubber.

BACKGROUND OF THE INVENTION

Since an ethylene-α-olefin copolymer rubber has superior physical properties such as weather resistance and ozone resistance, a foamed rubber obtained by foaming said rubber has been extensively used for applications such as car parts, particularly as sealing materials of a door and a luggage room of a car. From a viewpoint of valance between sealing performance and easy shutting of a door and a luggage room, almost all foamed rubbers applied therefor have been those having a density of 0.5 to 0.7 and a 100% tensile stress of not less than 0.9 MPa.

From a viewpoint of improving fuel cost saving particularly in the application for car parts, there has been demanded a foamed rubber which has a lightest weight possible as well as essential mechanical properties. However, if an expansion ratio in a conventional foamed rubber is increased in order to decrease the density only, sealing performance of the resulting foamed rubber is decreased with decrease of a 100% tensile stress, and as a result the above-mentioned demand cannot be satisfied.

SUMMARY OF THE INVENTION

It is an object of the present invention to provide a process for producing a foamed rubber having a lightweight, a high stress and a low compression set.

The inventor of the present invention has undertaken extensive studies to develop a process for producing a foamed rubber having a lightweight, a high stress and a low compression set. As a result, there has been found a surprising fact that a foamed rubber obtained by foaming a rubber composition comprising an ethylene-α-olefin copolymer rubber, mica and a foaming agent has a higher expansion ratio, namely, a lighter weight than that obtained by foaming a conventional ethylene-α-olefin copolymer rubber composition. Thereby, the present invention has been obtained.

The present invention provides a process for producing a foamed rubber comprising a step of foaming a rubber composition, which composition comprises:

(A) 100 parts by weight of an ethylene-α-olefin copolymer rubber, (B) 10 to 100 parts by weight of mica, and (C) 2 to 10 parts by weight of a foaming agent.

DETAILED DESCRIPTION OF THE INVENTION

The component (A), "ethylene-α-olefin copolymer rubber", used in the process for producing a foamed rubber in accordance with the present invention means an ethylene-α-olefin-non-conjugated polyene copolymer rubber as well as an ethylene-α-olefin copolymer rubber.

The above-mentioned α-olefin generally means an α-olefin having 3 to 20 carbon atoms. Specific examples of the α-olefin are propylene, 1-butene, 1-pentene, 1-hexene, 4-methyl-1-pentene, 1-octene and 1-decene. Of these, propylene and 1-butene are preferred from a viewpoint of availability. The above-mentioned α-olefins may be used singly or in combination of two or more thereof.

The above-mentioned non-conjugated polyene generally means a non-conjugated polyene having 5 to 20 carbon atoms, which is optionally substituted with halogen, especially preferred chlorine. As the non-conjugated polyene, non-conjugated dienes and non-conjugated trienes are usually used. Specific examples of the non-conjugated diene are linear non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetraindene, 5-vinylnorbornene, 5-ethylidene-2-norbornene and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene; 5-vinyl-2-norbornene; 5-(2-propenyl)-2-norbornene; 5-(3-butenyl)-2-norbornene; 5-(4-pentenyl)-2-norbornene; 5-(5-hexenyl)-2-norbornene; 5-(5-heptenyl)-2-norbornene; 5-(7-octenyl)-2-norbornene; 5-methylene-2-norbornene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene; and 4-ethylidene-12-methyl-1,1-pentadecadiene. Of these, 5-ethylidene-2-norbornene and dicyclopentadiene are preferred from a viewpoint of availability. The above-mentioned non-conjugated polyenes may be used singly or in combination of two or more thereof.

Examples of preferred ethylene-α-olefin copolymer rubbers are ethylene-propylene-5-ethylidene-2-norbornene copolymer rubber, ethylene-propylene-5-ethylidene-2-norbornene-dicyclopentadiene copolymer rubber, ethylene-butene-5-ethylidene-2-norbornene copolymer rubber and ethylene-butene-5-ethylidene-2-norbornene-dicyclopentadiene copolymer rubber.

A molar ratio of a unit derived from ethylene (such a unit being hereinafter called like "ethylene unit") to an α-olefin unit in the ethylene-α-olefin copolymer rubber is preferably 1/(0.1 to 1) from a viewpoint of flexibility of said copolymer rubber. A molar ratio of the ethylene unit to a non-conjugated polyene unit is preferably 1/(0.001 to 0.2) from a viewpoint of a vulcanization degree of the foamed rubber obtained by vulcanizing and foaming said copolymer rubber.

A solution viscosity [η] of the ethylene-α-olefin copolymer rubber measured in xylene at 70° C. is preferably from 0.2 to 10, and more preferably from 0.5 to 4, from a viewpoint of physical properties of the foamed rubber and handling facility of the copolymer rubber.

A process for producing the ethylene-α-olefin copolymer rubber is not particularly limited. For example, a known process using a polymerization catalyst such as a vanadium catalyst, a titanium catalyst and a metallocene catalyst can be applied.

Examples of the component (B), mica, used in the process for producing a foamed rubber in accordance with the present invention are white mica, black mica and red mica. Of these, white mica and black mica are preferred from a viewpoint of availability. In using them, the mica may be treated with a surface treatment agent such as mercaptosilane, vinylsilane and aminosilane. The above-mentioned mica may be used singly or in combination of two or more thereof.

An aspect ratio of mica is preferably from 5 to 50, and more preferably from 10 to 30. When the aspect ratio is less than 5, it is difficult to obtain a foamed rubber having a low density. When the aspect ratio exceeds 50, the surface of an extruded product comprising the rubber composition may be inferior. Here, the "aspect ratio" is an index for the characteristic feature of the shape of a substance having a plate or flake form, and means a ratio of a length of such a substance to a width thereof; and, "extruded product" means a product obtained by an extrusion molding method.

A proportion of the component (B) in the above-defined rubber composition is from 10 to 100 parts by weight, and preferably from 20 to 60 parts by weight based on 100 parts by weight of the component (A). When the proportion is less than 10 parts by weight, a foamed rubber having a light weight, a high stress and a low compression set cannot be obtained. When the proportion exceeds 100 parts by weight, a production cost of the foamed rubber increases, and in addition, a foamed rubber having a high expansion ratio, namely a light weight cannot be obtained in some cases.

As the component (c), the foaming agent, used in the process for producing a foamed rubber in accordance with the present invention, there are enumerated, for example, sodium hydrogencarbonate, sodium carbonate, ammonium hydrogencarbonate, ammonium carbonate, ammonium nitrite, N,N'-dimethyl-N,N'-dinitroso)-terephthalamide, N,N'-dinitroso-pentamethylene-tetramine, azodicarbonamide, azobisisobutyronitrile, azocyclohexylnitrile, azodiaminobenzene, barium-azodicarboxylate, benzene-sulfonyl-hydrazide, toluene-sulfonyl-hydrazide, toluene-sulfonyl-hydrazide derivatives, p-toluene-sulfonyl-semicarbazide, p,p'-oxybis(benzenesulfonyl-hydrazide), diphenylsulfone-3,3'-disulfonyl-hydrazide, calciumazide, 4,4'-diphenyl-disulfonylazide-p-toluene-sulfonylazide, p-toluenesulfonylacetonehydrazone and hydrazodicarbonamide. These foaming agents may be used singly or in combination of two or more thereof.

A proportion of the component (C) in the above-defined rubber composition is from 2 to 10 parts byweight, and preferably from 3 to 8 parts by weight, based on 100 parts by weight of the component (A). When the proportion is less than 2 parts by weight, a foamed rubber having a large expansion ratio cannot be obtained in some cases. When the proportion exceeds 10 parts by weight, in performing the foaming and crosslinking of the rubber composition, it may happen that leakage of a gas generated from the foaming agent occurs, the foamed rubber gets out of shape, or the foamed rubber bursts.

The above-mentioned foaming agent can be used in combination with a foaming coagent. Examples of the foaming coagent are urea compounds; zinc oxide; inorganic salts such as tribasic lead sulfate; metal soaps such as zinc stearate and lead stearate; and salicylic acid.

Each of the components (A), (B) and (C) may be used in combination with other components such as reinforcing agents; fillers; process oil; tackifying agents such as polybutene and rosin; resins such as polyethylene and polypropylene; stearic acid; polyethylene glycol, flame retarders; calcium oxide; crosslinking (vulcanization) coagents; crosslinking (vulcanization) accelerators; antioxidants; and processing coagents such as substitute (factice), fatty acid esters and metal salts of fatty acid. Examples of the reinforcing agents are carbon black and silica. Examples of the fillers are calcium carbonate, talc and clay. Examples of the process oil are paraffin oil, naphthene oil and aromatic oil. Among these process oil, paraffin oil having no aroma components is preferred.

A proportion of said other components in the above-defined rubber composition is preferably from 30 to 200 parts by weight, and more preferably from 50 to 150 parts by weight, based on 100 parts by weight of the component (A). When the proportion exceeds 200 parts by weight, mechanical properties of the foamed rubber may be inferior.

A proportion of the process oil in the above-defined rubber composition is preferably from 30 to 150 parts by weight, and more preferably from 40 to 100 parts by weight, based on 100 parts by weight of the sum of the component (A) and the component (B). When the proportion exceeds 150 parts by weight, a molded product comprising the rubber composition may get out of shape.

Among the foamed rubbers obtained by the process for producing a foamed rubber in accordance with the present invention, preferred are those having (i) a density of less than 0.5 (kg/liter), and (ii) a 100% tensile stress (X)(MPa) obtained by the following formula (1) of not less than 0.9 MPa, $$100\% \text{ tensile stress } (X) = 100\% \text{ tensile stress}(Y) \times 0.4/\text{density} \quad (1),$$

wherein "100% tensile stress (X)" means a 100% tensile stress (MPa) calculated by the above formula (1) when a density of the foamed rubber is assigned to be 0.4 (kg/liter), "100% tensile stress(Y)" means a 100% tensile stress(MPa) observed, and "density" means that mentioned in the above item (i).

As a specific process for producing the foamed rubber in accordance with the present invention from the above-defined rubber composition, there can be exemplified a process comprising:

(i) kneading the components (A), (B) and (C), and, if desired, a foaming coagent and other components mentioned above with a combination of Bambury mixer and a roll, or a combination of a kneader and a roll, to obtain a rubber composition, (ii) molding said rubber composition to obtain a molded product, and (iii) heating said molded product to perform foaming and crosslinking to obtain a foamed rubber.

At least two components used in the above step (i) may be blended in advance before use in said step (i).

A preferable molding method in the above step (ii) is an extrusion molding method from a viewpoint of productivity of the molded product. As an apparatus for performing the foaming and crosslinking, for example, an oven, a continuous hot air-crosslinking apparatus, an ultra high-frequency heating apparatus and a hot mold can be enumerated. The foaming and crosslinking can usually be performed under conditions of 140 to 250° C. and 2 to 30 minutes.

The most suitable applications of the foamed rubber obtained in the present invention are, for example, door sealing materials for cars, vehicles and ships; sealing materials for structure use in the fields of building and public works, electric appliances and housing facilities; joint mixtures; acoustical materials; heat insulating materials; and foam rolls.

EXAMPLE

The present invention is explained with reference to the following Examples, which are not intended to limit the scope of the present invention.

Components used were as follows.

1. Component (A)

As the component (A), ethylene-propylene-5-ethylidene-2-norbornene copolymer rubber was used. A weight ratio of ethylene unit/propylene unit/5-ethylidene-2-norbornene unit in said copolymer rubber was 54/36/10. Mooney viscosity $ML_{1+4}$ (125° C.) of the copolymer rubber measured according to JIS-K-6300 was 69.

2. Component (B)
(1) Surface-treated mica, a trade mark of MS325A, manufactured by Shiraishi Calcium Co. (hereinafter referred to as "Component (B-1)").
(2) Mica, a trade mark of MS325M, manufactured by Shiraishi Calcium Co. (hereinafter referred to as "Component (B-2)").

3. Component (C)

As the component (C), azodicarbonamide, a trade mark of VINYFOR AC-3, manufactured by Eiwa Chemical Ind. Co., Ltd., and p,p'-oxybis-benzenesulfonylhydrazide, a trade mark of NEOCELLBORN #5000, manufactured by said company were used.

4. Other Components
(1) Process Oil

Process oil, a trade mark of PS430, manufactured by Idemitsu Kosan Co., Ltd.

(2) Processing Coagent

As a processing coagent, a processing coagent, a trade mark of STRUCTOL WB212 (hereinafter referred to as "Processing coagent (1)"), manufactured by S & S Japan Co., and another processing coagent, a trade mark of STRUCTOL WB42 (hereinafter referred to as "Processing coagent (2)") manufactured by said company were used.

(3) Crosslinking (Vulcanization) Accelerator

As a crosslinking (vulcanization) accelerator, a mixture of 2-mercaptothiazol, zinc di-n-butyldithiocarbamate and di-pentamethylene thiuram tetrasulfide in a weight ratio of 1.5/0.4/0.2 was used.

Physical properties of the foamed rubber obtained were measured according to the following methods.

1. 100% Tensile Stress(X)(MPa)

A 100% tensile stress(X) (MPa) was obtained by the following formula (1), $$100\% \text{ tensile stress}(X) = 100\% \text{ tensile stress}(Y) \times 0.4/\text{density} \quad (1),$$

wherein "100% tensile stress (X)" means a 100% tensile stress (MPa) calculated by the above formula (1) when a density of the foamed rubber is assigned to be 0.4(kg/liter), "100% tensile stress(Y)" means a 100% tensile stress(MPa) observed, and "density" means an observed density of the foamed rubber.

2. Compression Set (%)

The foamed rubber was compressed until its thickness became a half (50%) of its original thickness, and under the so compressed condition, heat-treated at 70° C. for 22 hours in a gearoven. A compression set of the foamed rubber heat-treated was obtained according to a physical test method (SRIS-0101) for an expanded rubber.

Examples 1 and 2 and Comparative Examples 1 to 3

Components as shown in Table 1 were mixed in mixing proportions (parts by weight) as shown in said Table using a combination of Bambury mixer and a roll, thereby obtaining each rubber composition. Viscosity of the rubber composition obtained is shown in Table 2.

Successively, the rubber composition was continuously extruded with an extrusion-molding machine, thereby obtaining a molded product. The molded product was heated with air at 230° C. for 7 minutes to perform foaming and crosslinking, thereby obtaining a foamed rubber.

The density (kg/litter), water absorption (%), 100% tensile stress (X) (MPa), tensile strength (MPa) and compression set of the foamed rubber obtained are shown in Table 2.

As can be seen from the results of the above Examples, the foamed rubbers in Examples 1 and 2 in accordance with the present invention have a low density, a high 100% tensile stress and a low compression set.

On the contrary, with respect to Comparative Examples 1 to 3 wherein no mica of the component (B) was used:

(i) the foamed rubber in Comparative Example 1 is low in its density, but low in its 100% tensile stress and high in its compression set;

(ii) the foamed rubber in Comparative Example 2 is high in its density; and (iii) the foamed rubber in Comparative Example 3 is low in its density and high in its 100% tensile stress, but high in its compression set, which properties should be compared with those in Examples 1 and 2 having a similar density.

TABLE 1

|  | Example | | Comparative Example | | |
|---|---|---|---|---|---|
|  | 1 | 2 | 1 | 2 | 3 |
| Component (A) | 100 | 100 | 100 | 100 | 100 |
| Component (B) | | | | | |
| Component (B-1) | 40 | — | — | — | — |
| Component (B-2) | — | 40 | — | — | — |
| Component (C) | 6 | 6 | 6 | 6 | 6 |
| Other components | | | | | |
| Carbon black | 78 | 78 | 78 | 120 | 78 |
| Process oil | 46 | 46 | 46 | 46 | 46 |
| Zinc oxide | 5 | 5 | 5 | 5 | 5 |
| Stearic acid | 3 | 3 | 3 | 3 | 3 |
| Polyethylene glycol | 2 | 2 | 2 | 2 | 2 |
| Processing coagent (1) | 2 | 2 | 2 | 2 | 2 |
| Processing coagent (2) | 2 | 2 | 2 | 2 | 2 |
| Black substitute | 4 | 4 | 4 | 4 | 4 |
| Talc | — | — | — | — | 40 |
| Calcium oxide | 5 | 5 | 5 | 5 | 5 |
| Crosslinking (vulcanization) | | | | | |
| accelerator | 2.1 | 2.1 | 2.1 | 2.1 | 2.1 |
| Sulfur | 1.2 | 1.2 | 1.2 | 1.2 | 1.2 |

TABLE 2

|  | Example | | Comparative Example | | |
|---|---|---|---|---|---|
|  | 1 | 2 | 1 | 2 | 3 |
| Viscosity of rubber composition | | | | | |
| ML1 + 4, 100° C. | 35.1 | 35.7 | 32.2 | 44.9 | 34.0 |
| Foamed rubber | | | | | |
| Density (kg/litter) | 0.37 | 0.37 | 0.34 | 0.61 | 0.38 |
| Water absorption (%) | 13.5 | 9.1 | 1.5 | 11.1 | 5.9 |
| 100% Tensile stress (X) (MPa) | 1260 | 1110 | 960 | 2210 | 1210 |
| Tensile strength (MPa) | 2270 | 2240 | 2630 | 2950 | 2620 |
| Compression set (%) | 9.2 | 12.3 | 22.6 | 6.8 | 21.8 |

What is claimed is:

1. A process for producing a foamed rubber comprising a step of foaming a rubber composition, which composition comprises:
   (A) 100 parts by weight of an ethylene-α-olefin copolymer rubber,
   (B) 20 to 60 parts by weight of mica, and
   (C) 2 to 10 parts by weight of a foaming agent,
   wherein an aspect ratio of mica is 5 to 50, and the rubber composition is a thermosettable composition.

2. The process for producing a foamed rubber according to claim 1, wherein the rubber composition is an extruded product.

3. The process for producing a foamed rubber according to claim 1, wherein a molar ratio of an ethylene unit to an α-olefin unit in the ethylene-α-olefin copolymer rubber is 1(0.1 to 1), a molar ratio of an ethylene unit to a non-conjugated polyene unit in said copolymer rubber is 1/(0.001 to 0.2), and a solution viscosity $[\eta]$ of said copolymer rubber measured in xylene at 70° C. is from 0.2 to 10.

4. The process for producing a foamed rubber according to claim 1, wherein a density of the foamed rubber is less than 0.5(kg/liter), and a 100% tensile stress(X)(MPa) obtained by the following formula (1) is not less than 0.9 MPa, $$100\% \text{ tensile stress}(X) = 100\% \text{ tensile stress}(Y) \times 0.4/\text{density} \quad (1),$$

wherein "100% tensile stress(X)" means a 100% tensile stress calculated when a density of the foamed rubber is assigned to be 0.4(kg/liter), "100% tensile stress(Y)" means a 100% tensile stress observed, and "density" means an observed density of the foamed rubber.

* * * * *